Fig. 1

INVENTORS
Lloyd F. Brooke
William E. Elwell
Richard L. Meier

ATTORNEYS

Fig. 2

Patented Mar. 14, 1950

2,500,307

UNITED STATES PATENT OFFICE 2,500,307

ALIPHATIC OLEFINS AND CYCLIC PROCESS FOR MANUFACTURE THEREOF

Lloyd F. Brooke, Berkeley Highland Terrace, and William E. Elwell and Richard L. Meier, Berkeley, Calif., assignors to California Research Corporation, San Francisco, Calif., a corporation of Delaware Application April 5, 1947, Serial No. 739,612

9 Claims. (Cl. 260—683.15)

This invention relates to hydrocarbon compositions consisting at least in major proportion of a mixture of aliphatic mono-olefins, said compositions having certain molecular weight distributions, and to a process of producing the same. More particularly, the invention involves the production of aliphatic mono-olefin mixtures in the $C_{12}$ to $C_{15}$ molecular weight range and with controlled chain branching to obtain increased resistance to decomposition or fragmentation.

The present application is a continuation-in-part of our earlier application Serial No. 671,382, filed May 21, 1946, entitled "Aliphatic olefins and manufacture thereof."

An object of the invention is to produce aliphatic mono-olefins of branched-chain structure and improved resistance to fragmentation in the presence of anhydrous hydrofluoric acid under alkylating conditions.

Another object of the invention comprises the production of mixed aliphatic mono-olefins having a molecular weight distribution capable of yielding a superior detergent on further processing and of resisting decomposition or chain fragmentation during such processing.

Additionally an objection of the invention comprises the production of branched chain mono-olefins capable of resisting chain fragmentation during conversion to phenyl alkanes.

A still further object of the invention is to provide a process of producing in high yield a mixture of branched-chain alkenes resistant to fragmentation and having a molecular weight distribution within the $C_{12}$ to $C_{15}$ range particularly adapted for the manufacture of detergents.

To improve operation of a cyclic polymerization process by minimizing continued and incremental reduction in conversions of monomer olefin to polymer olefin which is otherwise encountered in cyclic processes for manufacturing olefins from propylene is an additional object of this invention.

It is also an object to provide a method of reducing required recycle rates for any given conversion of monomer, or conversely for increasing productive capacity for any given recycle rate in a cyclic process for converting propylene into a mixture of olefins boiling above about 325° F. and below about 520° F.

Other objects and advantages of the invention will be apparent from the following description and attached drawing.

It has been discovered that aliphatic mono-olefins satisfying the foregoing objectives can be obtained by mixing propylene with a $C_6$ to $C_{11}$ olefin of the type hereafter described and polymerizing the mixture in the presence of an acid polymerization catalyst to produce a mixture of mono-olefins by interpolymerization. The resulting mono-olefinic interpolymers are characterized by branched chain structure which has marked resistance to fragmentation in the presence of anhydrous hydrofluoric acid and by a molecular weight predominantly in the $C_{12}$ to $C_{18}$ range which, upon proper fractionation, gives a high yield of mono-olefins with a molecular weight distribution in the $C_{12}$ to $C_{15}$ range. Further, it has been found that the mono-olefins thus obtained in the $C_{12}$ to $C_{15}$ range comprise a complex mixture of compounds having a structure and a molecular weight distribution within this range which is particularly adapted to the manufacture of phenyl alkanes and of very effective synthetic detergents by conversion of the even more complex mixture of phenyl alkanes to the corresponding sulfonates.

The $C_6$ to $C_{11}$ olefins with which the propylene is interpolymerized in accordance with this invention are exemplified by straight-chain olefins such as n-hexene-1, n-heptene-1, n-octane-1, n-nonene-1, n-decene-1, or mixtures thereof. Other suitable olefins which are substantially straight-chain in structure comprise a complex mixture of $C_6$ to $C_{11}$ olefins obtained by fractionation from cracked paraffin wax in accordance with known procedures or by fractionation of olefins from the hydrogenation of carbon monoxide by the well-known Fischer-Tropsch process.

Despite the fact that (1) branched chain $C_{12}$ to $C_{15}$ olefin structures of the type obtained from butene-1, butene-2, and isobutene polymers are relatively unstable and subject to large losses by fragmentation in the presence of hydrofluoric acid under alkylating conditions; and (2) notwithstanding that branched-chain structures are obtained in propylene polymerization and might be predicted to yield correspondingly unstable olefins, it has been discovered that $C_{12}$ to $C_{15}$ olefins having marked resistance to fragmentation in the presence of hydrofluoric acid under alkylating conditions may be obtained by polymerizing 1.0 liquid volume of propylene in admixture with at least about 0.2 and more desirably 2.0 to 10 parts by liquid volume (based on the propylene) of $C_6$ to $C_{11}$ olefins consisting essentially of polypropylene or interpolymers of propylene and ethylene. About 3 to 5.5 liquid volumes of $C_6$ to $C_{11}$ olefins to 1 volume of liquid propylene feed is presently preferred. From the foregoing it will be apparent that the $C_6$ to $C_{11}$ olefins with which the propylene is interpolymerized may range from normal olefins having no chain ramification to olefins having polypropylene chain ramification. In general, polypropylene chain ramification is characterized by a straight-chain structure with only methyl groups as side chains, the side methyl groups being $x/3+1$ in number (where $x$ is the number of carbon atoms in the molecule) and thought generally to be situated on alternate carbon atoms of the chain. Thus, the type formula for polypropylene is usually written During the foregoing copolymerization of propylenes with $C_6$–$C_{11}$ olefins specifically exemplified by olefins of polypropylene structure, all of the copolymer product is not in the desired higher molecular weight range, that is, boiling above 325 and preferably from about 360 to about 520° F. On the contrary, there is formed, very substantial quantities of light polymer comprising $C_{11}$ and lower olefins boiling below 360° F., for example. To convert these light polymers to the desired higher molecular weight range product, a cyclic process is needed, namely, one in which $C_{11}$ and lower polymers are returned to the polymerization zone for further conversion to the $C_{12}$–$C_{15}$ product. Preferably the light $C_{11}$ and lower polymers are returned again and again a sufficient number of times to be entirely consumed in the polymerization operation. This latter type of cyclic operation is herein termed "recycle to extinction."

When one attempts to split the polymer reaction product at 360° F., for example, and recycle the more volatile fraction ($C_{11}$ and lower), an entirely unpredictable difficulty is encountered. The system initially operates satisfactorily but as recycle continues conversion steadily drops and the volume of recycle increases correspondingly until the plant has little, or at best greatly reduced, capacity for conversion of fresh propylene feed. It might be assumed that the difficulty is due to various factors including, for example, suggestions that the lighter polymer will not copolymerize further with the fresh propylene feed to form the desired additional higher molecular weight polymer, or that the catalyst loses activity by reason of some poisoning action of the recycle polymer. Investigations will reveal that such losses in conversion rate and plant capacity in the cyclic operation is not due to catalyst poisoning nor does the loss arise from other operating factors which one might predict from accepted theories of polymerization.

Quite the contrary, since it has been found that the foregoing drop in conversion and concomitant increase in the recycle ratio can be minimized by rejection of a selected hydrocarbon fraction from the polymer reaction products.

Although the mechanism of the phenomenon is not presently understood, it has been discovered that in the foregoing type of cyclic process, saturated hydrocarbons are formed in sufficient quantity to build up in the system and interfere with the desired conversion of monomer olefin to polymer olefin. The high levels which saturate formation may reach are illustrated by continuous recycle of $C_{11}$ and lighter olefins with continued build-up of saturate hydrocarbons, wherein the recycle stream may reach a saturate content of 60% or greater.

Additionally, it has been found that the saturated hydrocarbons formed in the cyclic operation have an unpredictable molecular weight distribution in the recycle stream. A typical molecular weight distribution of saturates in the $C_6$ to $C_{11}$ range is illustrated by the following analyses of 10% distillation cuts taken on a recycle stream boiling from 100° to 350° F.

| Distillation Cut | Volume Percent Saturated | Mol. Wt. | Number (Approx.) Carbon Atoms |
|---|---|---|---|
| First 10% | 47 | 89 | 6.4 |
| Second 10% | 45.7 | 99 | 7.1 |
| Third 10% | 43.3 | 113 | 8.1 |
| Fourth 10% | 36.1 | 121 | 8.7 |
| Fifth 10% | 36.3 | 130 | 9.3 |
| Sixth 10% | 33.8 | 133 | 9.5 |
| Seventh 10% | 28.0 | 134 | 9.6 |
| Eighth 10% | 18.3 | 140 | 10.0 |
| Ninth 10% | 9.5 | 145 | 10.4 |
| Tenth 10% | 3.0 | 159 | 11.3 |

Accordingly, the present invention involves the discovery that loss in conversion and increase in recycle ratio can be minimized and controlled in the foregoing processes by discarding a fraction comprising saturated hydrocarbons formed in the polymerization zone. The saturated hydrocarbons may be removed and discarded either from the entire polymerization effluent or from a portion thereof such as the light recycle stream. One method of diminishing saturate buildup is to bleed out a portion of the light recycle stream. However, this method is relatively non-selective, and methods yielding greater selectivity are preferred. Selectivity may be based either on molecular weight distribution or on differences in properties of the saturated paraffinic hydrocarbons and the unsaturated olefinic components. Thus, suitable highly selective methods for removing the saturated hydrocarbons are liquid phase selective solvent extraction and, alternatively, selective adsorption of unsaturates on silica gel or the like.

Although somewhat increased capacity will result from the foregoing highly selective removal of substantially all the nonpolymer hydrocarbons formed in the polymerization operation, such a complete removal frequently will be found sufficiently expensive to warrant another type of operation herein disclosed. Thus, selectivity may be based on distillation coordinated with molecular weight distribution of the saturates. It has been found that if $C_5$ and lighter saturated hydrocarbons formed in the polymerization zone are discarded by simple fractional distillation, saturate buildup can be controlled satisfactorily. The $C_6$ and heavier saturated components may be recycled. Surprisingly enough, the return of these $C_6$ and heavier saturates to the polymerization zone either suppresses formation of additional saturated hydrocarbons of similar molecular weight or the recycled saturated components are decomposed to lower molecular weight compounds and thereby eliminated in the subsequent distillation steps. In either event, continued buildup of $C_6$ and higher saturated hydrocarbons is avoided with the result that monomer olefin conversion to polymer olefin conversion, as well as recycle ratios, can be maintained at satisfactory operating levels by elimination of $C_5$ and lower saturates only.

In an exemplary operation hereinafter described, the lower molecular weight saturated hydrocarbons are separated from the polymerization reaction mixture and the higher molecular weight components, for example, those retained in recycle stock boiling above 110° F. are returned to the polymerization zone. Such recycle of higher boiling non-polymer hydrocarbons together with olefin polymers of similar boiling range has been found to give a steady state operation in a continuous cyclic process with a saturate content of about 25% in the recycle stream. By accepting a propylene conversion of about 90% in such an operation, the saturate discard can be effected very simply, namely, by eliminating lighter than $C_6$ reaction components in a distillation stripper for the reaction effluent. When and if somewhat higher recycle ratios are acceptable, the distillation stripper may be operated to split the saturated hydrocarbon fraction in the $C_5$ boiling range so that $C_4$ and lighter hydrocarbons together with some of the $C_5$ fraction are eliminated. A portion of the $C_5$ together with higher boiling saturated compounds flow back with the recycle stream to the polymerization zone.

The amount of light non-polymer hydrocarbon formation in per cent of propylene reacted in a typical steady state operation of a cyclic process is as follows:

| | Per cent |
|---|---|
| Butenes | 0.34 |
| Butanes | 3.16 |
| Pentenes | 2.70 |
| Pentanes | 5.0 |

As previously stated, the mixed $C_{12}$ to $C_{15}$ olefins of this invention are much more resistant to fragmentation by hydrofluoric acid under alkylating conditions than are other more highly ramified branched-chain olefins, such as the polybutenes in the same molecular weight range. This is illustrated by the fact that in the hydrofluoric acid catalyzed alkylation of benzene with the polybutene type olefins to form alkyl benzenes, almost 50% loss to lighter than $C_{12}$ alkylate occurs by reason of fragmentation of polybutene olefins and formation of light alkyl benzenes from the decomposed olefins, and less than about 30% of $C_{12}$ alkylated benzene yield is obtained. Conversely, yields of 80% or more of monophenyl $C_{12}$ alkanes are obtained with the $C_{12}$ polypropylene ramified type olefin and less than about 12% loss to light alkylate occurs under corresponding alkylating conditions.

An additional new and unpredictable property of the polypropylene ramified type olefins comprises the fact that the resulting phenyl alkane derivatives are sufficiently stable to be substantially completely sulfonated in high yield without material formation of unsulfonated residues, color bodies and the like. This stability is important since relatively pure phenyl alkane derivatives can be obtained without the necessity of expensive purification treatments. For example, a phenyl substituted alkane of the $C_{12}$ polypropylene ramified type will yield approximately 100% of the corresponding sulfonic acid of good color and substantially free of unsulfonated residue. On the other hand, sulfonation of benzene which has been alkylated with a $C_{12}$ polybutene under comparable conditions has been found to yield only about 74.4% of sulfonic acid containing 25.6% of unsulfonated residue which generally must be removed by purification treatment.

A preferred process comprises continuously feeding propylene with $C_6$ to $C_{11}$ olefins, desirably polypropylene, in the ratio of from at least about 0.2 liquid volumes of the latter olefin to 1 liquid volume of propylene to a polymerization zone comprising a fixed bed of a catalyst known in the art as a solid phosphoric acid catalyst. Preferred ratios of $C_6$–$C_{11}$ polypropylene to liquid propylene feed are from 3:1 to 5.5:1 as previously described. However, the $C_6$–$C_{11}$ olefin may be selected from the group consisting of straight-chain olefins and propylene polymers. The polymerization is effected at a catalyst temperature of from about 375° F. to about 500° F., preferably from about 400° F. to about 460° F. The preferred catalyst is phosphoric acid (100% to 110% orthophosphoric acid) on a suitable porous support, such as kieselguhr or active carbon. Space rate is desirably from .02 to 2 volumes of liquid propylene per volume of catalyst per hour. Pressure may vary from 100 to 2,000 pounds per square inch gauge, 200 to 600 pounds per square inch being more desirable except that pressures of 250 pounds or less may tend to give lower rates of saturate formation. The polymer mixture is then withdrawn from the polymerization zone and fractionated to yield a mixed mono-olefin fraction having a molecular weight distribution in the $C_{12}$ to $C_{15}$ range. Suitable olefin mixtures have an initial boiling point of about 325° F. and an end point of about 520° F. at least about 50% of which boils above 380° F., or the polymer mixture may be fractionated to yield a $C_{12}$ olefin cut having a boiling range from about 330° F. to about 420° F., at least about 50% of which boils above 350° F., and a $C_{15}$ fraction having a boiling range from about 420° F. to about 510° F., at least about 50% of which boils above 450° F. A preferred mixture for the manufacture of monophenyl alkanes comprises a fraction having an initial boiling point of from about 360° F. to about 370° F., and an end point of from about 500° F. to about 520° F., at least about 80% of which boils within the range of from about 380° F. to about 440° F., and at least about 50% of which boils above 390° F. The foregoing boiling ranges are determined by a standard ASTM-D86 distillation.

Figure 1:
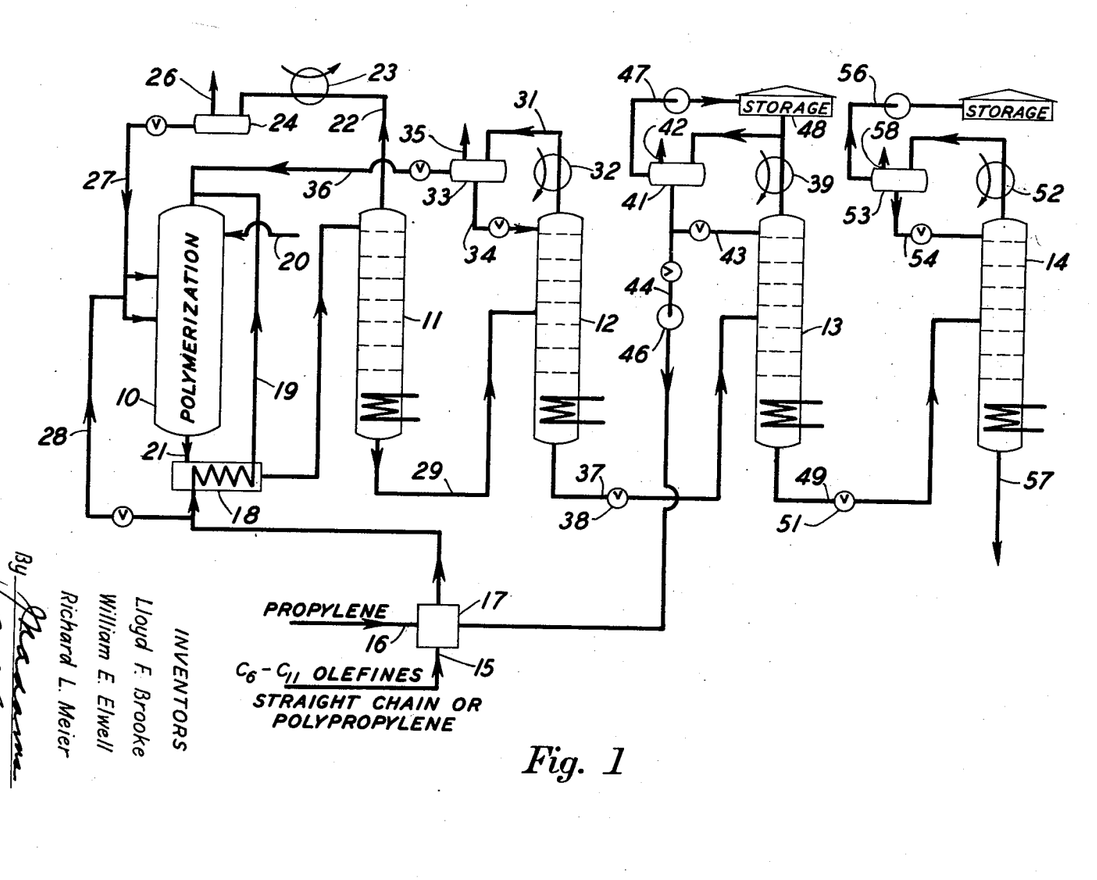
Fig. 1 is a diagrammatic flow sheet of a process and apparatus for preparing interpolymers, separating $C_{12}$ and $C_{15}$ olefin fractions, and discarding saturated paraffinic hydrocarbons formed during polymerization as herein disclosed.

Reference to Fig. 1 of the drawing will reveal that in this embodiment of the invention only the lighter or more volatile saturates formed in the polymerization zone are eliminated together with fixed gases. Thus, there is provided a polymerization chamber 10 from which the reaction mixture is passed first to a stripper 11 for removing only the lighter or more volatile hydrocarbons formed in the polymerization chamber 10 together with fixed gases and other light hydrocarbons present in the feed. The stripped reaction mixture then flows to a fractionator 12 for separating $C_{11}$ and lower olefin polymers as overhead. A second fractionator 13 receives the bottoms from fractionator 12 and separates a $C_{12}$ olefin mixture as an overhead fraction. Final fractionator 14 separates the bottoms from fractionator 13 into a $C_{15}$ olefin mixture as overhead and heavier than $C_{15}$ hydrocarbons as bottoms.

More specifically, $C_6$ to $C_{11}$ olefins selected from the group consisting of straight-chain olefins and polypropylene are fed by way of inlet line 15 together with propylene by way of inlet line 16 to mixer 17. The resulting olefin mixture then passes through preheater 18 and feed line 19 to a fixed bed solid phosphoric acid catalyst in polymerization chamber 10. Steam also is introduced into the polymerization chamber by way of line 20 in a quantity sufficient to maintain a partial pressure of water vapor equal to that of the phosphoric acid catalyst in order to prevent dehydration of the catalyst which is maintained at the desired temperature. Interpolymerization of the propylene with the $C_6$ to $C_{11}$ olefins is effected upon contact with the polymerization catalyst, and the resulting mixture is then conducted by way of conduit 21 through heat exchanger 18 to stripper 11, where low boiling hydrocarbons are removed as overhead through line 22. The gases removed in the stripper 11 comprise mostly propane and propene together with other hydrocarbons containing, for example, less than five carbon atoms. The stripped gas flows through cooler 23 to collecting drum 24, where uncondensed gases may be discharged through vent line 26. In order to control the temperature developed by exothermic heat of reaction in the polymerization zone, a portion of the cooled gases and of any condensate formed in drum 24 may be conveyed by way of valve-controlled line 27 and introduced in the polymerized mixture as a diluent and cooling gas. However, this tends to increase saturate buildup in the cyclic system and it is, therefore, preferred to facilitate control of the reaction temperature by providing a cold feed inlet stream. For this purpose valve-controlled conduit 28 is provided for by-passing some of the reaction feed directly to the polymerization zone without preheating in heat exchanger 18.

The stripped olefin mixture flows from the bottom of stripper 11 by way of conduit 29 to the first fractionator 12 where light olefin polymers, together with any saturated hydrocarbons, in the $C_6$ to $C_{11}$ range are separated as a vapor phase overhead which passes by way of outlet conduit 31 through condenser 32 to condensate drum 33. Fractionation is controlled and improved by returning a portion of the condensate from drum 33 to fractionator 12 by way of valve-controlled reflux line 34.

In order to increase the yield of $C_{12}$–$C_{15}$ olefins, a cyclic operation is preferred. In the cyclic operation at least a portion of the $C_6$–$C_{11}$ olefins is returned by way of valve-controlled line 36 to polymerization zone 10 to cause interpolymerization of these lower polymers with the propylene feed to yield additional $C_{12}$ to $C_{15}$ olefins. Excess $C_6$–$C_{11}$ olefins may be withdrawn by means of discharge line 35. In addition to discarding saturates by means of stripper column 11, further increases in conversion and reductions in recycle rate may be obtained by treating recycle stream 36 to separate saturates from unsaturates or alternatively by treating the portion of $C_6$ to $C_{11}$ olefins withdrawn by line 35 in a similar manner and returning the olefins denuded of saturates to recycle stream 36. Suitable processes are known for separating saturated aliphatic from unsaturated aliphatics in the $C_6$–$C_{11}$ molecular weight range. Exemplary processes are liquid phase selective solvent extraction and, alternatively, preferential adsorption of unsaturated hydrocarbons on an adsorbent such as silica gel or the like followed by removal of the saturate fraction and recovery of the unsaturated adsorbed fraction.

The $C_{12}$ and higher boiling olefins pass downwardly through fractionating column 12 and out discharge line 37 through pressure-reducing valve 38 to fractionator 13 where a $C_{12}$ olefin fraction boiling, for example, from about 330° F. to about 420° F. is taken overhead through condenser 39 and collected in condensate drum 41. This fractionation may be effected under vacuum which is maintained through vacuum line 42 connected to a vacuum pump, steam ejector or other suitable means for maintaining the required subatmospheric pressure. A portion of the condensate may be returned as reflux to fractionator 13 through valve-controlled reflux line 43. It is sometimes found desirable to recycle another portion of the $C_{12}$ olefin cut by way of valve-controlled line 44 through circulation pump 46 to mixer 17. The remainder of the $C_{12}$ olefin cut is pumped through conduit 47 to storage 48.

The $C_{15}$ and higher boiling olefins flow downwardly through fractionating column 13 and are discharged by way of line 49 through pressure-reducing valve 51 into fractionator 14 where a $C_{15}$ olefin fraction boiling, for example, from about 420° F. to about 500° F. is taken overhead through condenser 52 to condensate drum 53. A portion of the condensate may be returned to fractionator 14 by way of valve-controlled reflux line 54 and the remainder pumped to storage through line 56. Bottoms from fractionator 14 are discharged through outlet line 57.

It is preferred to operate fractionating column 14, as well as column 13, under vacuum in order to avoid deterioration of the $C_{12}$ to $C_{15}$ olefins by decomposition or further polymerization. Desirably fractionator 14 is maintained at a higher vacuum than fractionator 13 by means of vacuum line 58 connected to a suitable device for maintaining reduced pressure, such as a vacuum pump or steam ejector.

Exemplary polymerization conditions in the process of Fig. 1 are:

Temperature of
   fresh feed____ 350–425° F.
Temperature of
   catalyst _____ 375–500° F. (preferably 400–460° F.)
Pressure _______ 200–600 lbs./sq. in.
Propylene feed_ .02–0.2 V./V./hr.
Catalyst _______ 100–110% orthophosphoric acid on kieselguhr A typical propylene-ethylene feed stock will contain other normally gaseous saturated hydrocarbons in proportions, such as the following:

| Hydrocarbon | Volume Per Cent (Vapor) |
|---|---|
| Ethylene | 3.2 |
| Ethane | 2.6 |
| Propylene | 16.0 |
| Propane | 57.5 |
| Butene (impurity) | 0.1 |
| Butane | 3.7 |

The remaining 16.9% of the feed may be $C_{11}$ or lower polymers previously formed by polymerization of such a feed or may be a mixture of $C_6$ to $C_{11}$ normal olefins as previously disclosed.

The effect of the amount of $C_6$ to $C_{11}$ olefins on the yield of $C_{12}$ to $C_{15}$ interpolymers obtained with propylene is illustrated by the following data:

| Relative Volume Propylene in Feed | Relative Volume $C_6$ to $C_{11}$ in Feed | Per Cent $C_{12}$ to $C_{15}$ Olefin In Polymer (Based on Propylene Polymerized) |
|---|---|---|
| 1.0 | 0 | 24 |
| 1.0 | 0.5 | 57 |
| 1.0 | 1.0 | 71 |
| 1.0 | 2.2 | 89 |

In these runs the average temperature of catalyst was 430° F., pressure, 200 pounds per square inch gauge, and propylene feed rate, .032 V./V./hr. Higher pressures increase the yield of $C_{12}$–$C_{15}$ olefin interpolymers as illustrated by the following data:

| Pressure | Space Rate, V./V./hr. | Yield Per Cent Based on Propylene Feed |
|---|---|---|
| 200 lbs./sq. in | .074 | 81 |
| 500 lbs./sq. in | .074 | 110 |
| 200 lbs./sq. in | .032 | 92 |
| 500 lbs./sq. in | .032 | 121 |

These yields are based on fresh propylene feed in the copolymerization of Fig. 1 without recycle of light polymer. In this situation it is preferred to operate the process at 400 to 600 pounds per square inch pressure. In these latter runs, average catalyst temperature was 430° F., and the ratio of $C_6$–$C_{11}$ olefins to propylene was approximately 2.2:1.

Figure 2:
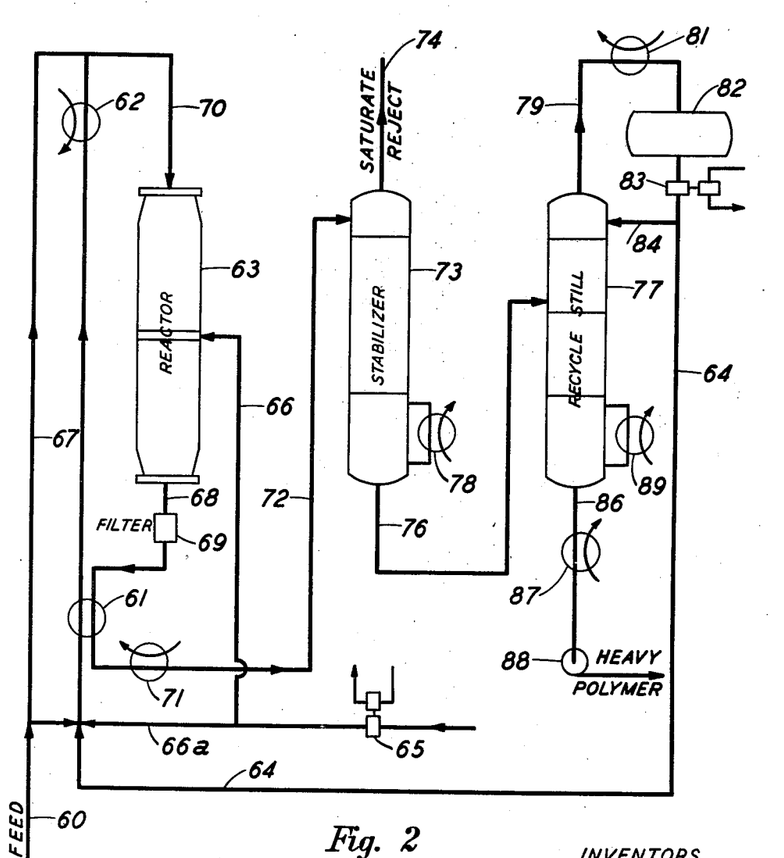
Fig. 2 is a diagrammatic flow sheet of a simplified process and apparatus for preparing interpolymers of propylene and utilizing only those $C_6$–$C_{11}$ olefins formed in the polymerization process for copolymerization with fresh propylene.

Referring to the flow sheet of Fig. 2 a mixture of propylene and ethylene containing some fixed gases is introduced by way of line 60 through heat exchanger 61, preheater 62 and inlet line 70 to a fixed bed solid phosphoric catalyst chamber 63. $C_{11}$ and lower olefins previously formed by the polymerization of a mixture of ethylene and a propylene are simultaneously passed from recycle line 64 into heat exchanger 61 and pass with the feed olefins through the polymerization catalyst where mixing and interpolymerization with the fresh propylene and ethylene feed is effected. Water preferably as steam is injected into the catalyst chamber by injection pump 65 through line 66 to maintain a partial pressure of water vapor which will avoid dehydration of the phosphoric acid catalyst. A branched water or steam inlet 66a likewise may serve to introduce controlled amounts of $H_2O$ into the hydrocarbon feed for similar purposes. The interpolymers of the fresh propylene feed with the recycle $C_{11}$ and lower olefins are discharged from the bottom of the polymerization chamber by way of outlet conduit 68 through filter 69, heat exchanger 61, cooler 71 and line 72 to stripping or stabilizing column 73.

In order to control temperature of the feed and reduce reaction temperature in the polymerization zone regulated portions of the fresh olefin feed flow through by-pass line 67 and join the remainder of the reaction feed between preheater 62 and reactor 63.

The crude interpolymer is stripped and stabilized in column 73 to separate a $C_5$ and lighter hydrocarbons fraction as an overhead which is discharged through conduit 74. As previously explained these $C_5$ and lighter hydrocarbons include saturated butanes and pentanes as well as minor amounts of butenes and pentenes formed in polymerization reactor 63.

$C_6$ and heavier olefins together with corresponding saturates flow downwardly through stabilizer 73 and outlet conduit 76 to recycle still and fractionating column 77. Reboiler 76 supplies heat to stabilizer column 73 for driving off the $C_4$ and lighter hydrocarbons together with at least some $C_5$ hydrocarbons in the stripping operation.

In recycle still 77, to which heat is supplied by reboiler 89, the $C_6$–$C_{11}$ olefins are separated as an overhead fraction boiling for example below about 360° F. This overhead fraction passes from the top of the fractionating column of still 77 through outlet 79 and condenser 81 to a condensate drum 82. A portion of the liquid phase olefin condensate may be returned to recycle still or fractionating column 77 by way of a valve-controlled reflux line 84. A steam operated circulation pump 83 is provided in the discharge line from condensate drum 82. $C_6$–$C_{11}$ olefin condensate is pumped from drum 82 through recycle line 64 to polymerization chamber 63 through heat exchanger 61 and preheater 62 as previously disclosed.

$C_{12}$ and higher olefins are removed from the bottom of recycle still 77 through outlet 86, cooler 87 and "heavy" polymer discharge pump 88. This heavier polymer product comprises primarily $C_{12}$–$C_{15}$ olefins but contains some higher boiling components. In order to obtain the preferred mixture, as previously disclosed, this heavy polymer is fractionated to obtain an overhead olefin cut having an initial boiling point of from about 360° F. to about 370° F. and an end point of from about 500 to about 520° F., although an end point of 480° F. may be used. It is also preferred that about 80% of this olefin cut boil within the range of 380° F. to about 440° F. The separation of this $C_{12}$–$C_{15}$ olefin cut preferably is effected under vacuum in a fractionating column; reduced pressure is maintained on the system. Distillation bottoms containing some diolefins and having an initial boiling point of from about 500–520° F. are thus eliminated and detrimental effects on stability of the polymer in hydrogen fluoride alkylation reactions are thereby reduced or avoided.

A typical stock balance for operation of the process and apparatus of Fig. 2 with recycle to extinction is given in Table I. Reaction conditions for this operation are propylene space rate of .041 liquid volumes per volume of catalyst per hour, reactor outlet temperature—460° F., and reactor pressure of 250 pounds per square inch gauge. Reactor conversion of propylene was about 85% and of ethylene about 20%. Nonpolymer hydrocarbons formed in the reactor based on propylene converted were butene—0.34%, butane—3.16%, pentene—2.70%, pentane—5.0%. For steady state operation, with recycle to extinction the recycle stream contains only about 25% saturates.

TABLE I

Quantities in lbs./day

| Component | Feed | Stream No. | | | | | Heavy Polymer |
|---|---|---|---|---|---|---|---|
| | | 64 | 70 | 72 | 74 | 76 | |
| $CH_4$ | 14,500 | | 14,500 | 14,500 | 14,500 | | |
| $C_2H_4$ | 10,630 | | 10,630 | 8,500 | 8,500 | | |
| $C_2H_6$ | 69,200 | | 69,200 | 69,200 | 69,200 | | |
| $C_3H_6$ | 69,200 | | 69,200 | 10,400 | 10,400 | | |
| $C_3H_8$ | 137,700 | | 137,700 | 137,700 | 137,700 | | |
| $C_4H_8$ | 1,660 | 2,700 | 4,360 | 4,380 | 1,680 | 2,700 | |
| $C_4H_{10}$ | 3,190 | 8,100 | 11,290 | 13,150 | 5,050 | 8,100 | |
| $C_5H_{10}$ | | 6,600 | 6,600 | 8,190 | 1,590 | 6,600 | |
| $C_6H_{12}$ | | 12,600 | 12,600 | 15,540 | 2,940 | 12,600 | |
| Light Recycle (110°–360° F.) | | 570,000 | 570,000 | 570,000 | | 570,000 | |
| Heavy Polymer (360°+) | | | | 54,520 | | 54,520 | 54,520 |
| Total | 306,080 | 600,000 | 906,080 | 906,080 | 251,560 | 654,520 | 54,520 |

Figure 3:
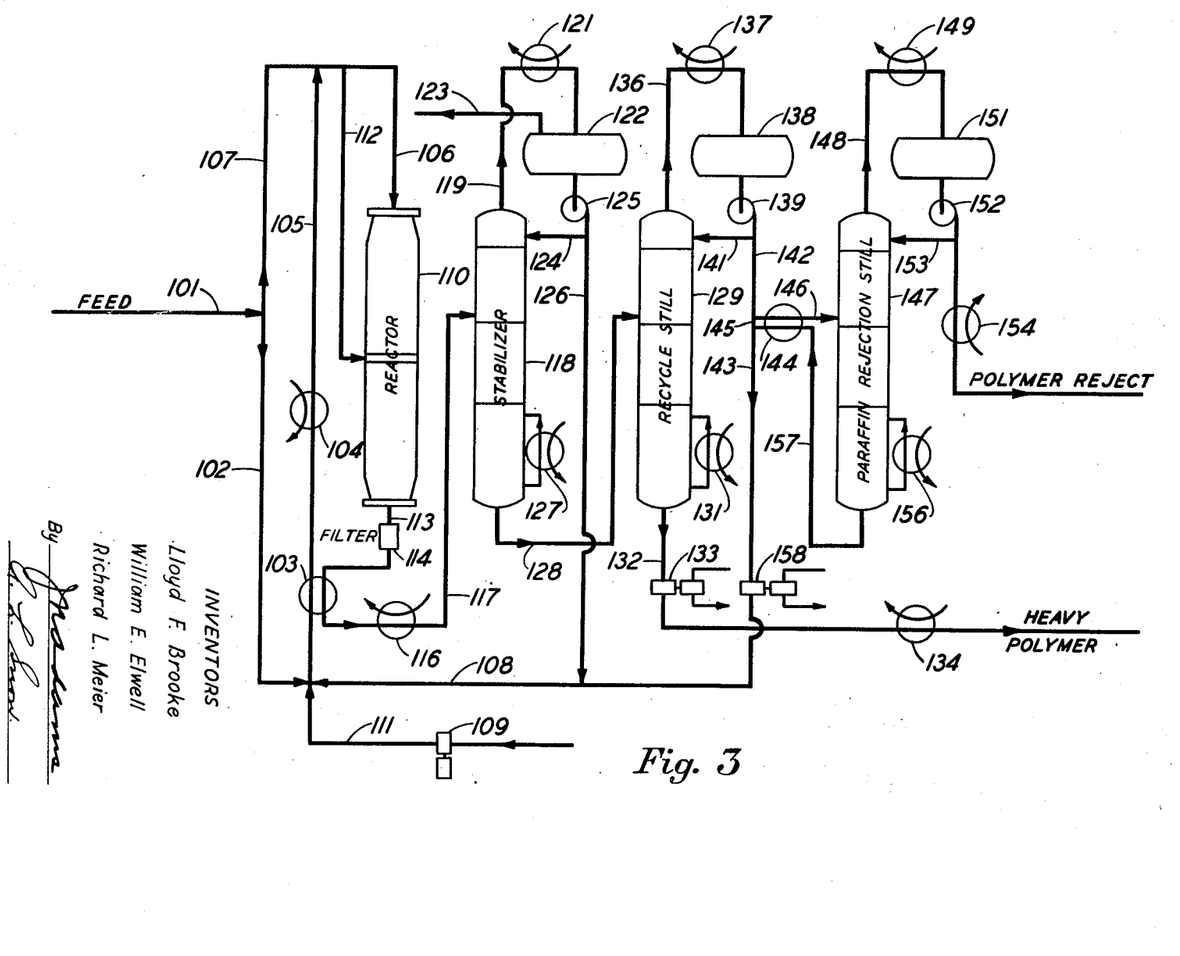
Fig. 3 is a schematic flow sheet of a process for preparing mono-olefins and for withdrawing saturates together with a portion of polymer by fractionation of recycle light polymer stream as well as by elimination of lighter saturates by stripping or stabilizing polymerization effluent.

In Fig. 3, propylene feed containing propane is introduced to the system through main line 101 and flows to polymerization reactor 110 through branched feed line 102, heat exchanger 103 and preheater 104 in line 105. Previously formed light polymer from recycle line 108 is blended with propylene feed. Temperature control is afforded by feed by-pass line 107 for introducing controlled amounts of cool propylene feed into the heated portion of the hydrocarbon feed of line 105. The composite feed stock may enter reactor 110 either by way of main composite feed line 106 or a second by-pass composite feed line 112. This dual feed into reactor 110 affords control of temperature distribution in the catalyst bed and reduces a tendency to form excessively high temperatures in a hot spot in the reaction zone otherwise occasioned by fast reaction of a large portion of the entire olefin feed in a limited zone of the reactor.

The downwardly flowing mixture of propylene and recycled light polymers are intermingled and copolymerized in reactor 110, and the reaction product flows from outlet 113 through filter 114, preheater 103, cooler 116, and line 117 to stripper or stabilizer 118. $C_3$ and lighter hydrocarbons are stripped from the reaction mixture in stabilizer 118 operated under reflux conditions. The overhead fraction of $C_3$ and lighter hydrocarbons flows by way of outlet 119 through refrigerated condenser 121 to condensate drum 122. Regulated amounts of $C_3$ hydrocarbons are discharged by way of outlet line 123. Reflux on stabilizer 118 is maintained by circulation pump 125 and valve-controlled reflux line 124.

Concentration of propylene in the feed to the polymerization reactor is regulated by recycling controlled amounts of $C_3$ and lighter hydrocarbons, mainly propane, from condensate drum 122 through line 126 to polymer recycle line 108. This recycle of propane serves as a further control on reaction temperatures and rates in polymerization reactor 110.

Steam or water is introduced into the feed by way of steam operated injection pump 109 and $H_2O$ inlet line 111 to hydrocarbon feed from line 102.

$C_4$ and heavier hydrocarbon flows downwardly through stripping column 118 and the lighter hydrocarbons are distilled out by heat supplied to the column through reboiler 127. The stripped reaction mixture flows from stabilizer 118 through line 128 to recycle still and fractionating column 129. The polymer mixture is here fractionated into a light polymer overhead and a so-called "heavy" polymer bottoms fraction. This split may be made so that hydrocarbons boiling below 325° F. and preferably below 360° F. are distilled overhead through outlet 136 and condenser 137 to reflux drum 138. Reflux on column 129 is maintained by circulation pump 139 and valve-controlled reflux line 141.

Olefin polymer boiling above 325° F. and preferably above 360° F. is stripped of the light polymer product and flows downwardly through still 129 through outlet 132, steam operated circulation pump 133, cooler 134 and heavy polymer product line to further fractionation (not shown). As previously disclosed, this heavy polymer fraction consists primarily of $C_{12}$–$C_{15}$ monoolefins, but contains heavier polymers which are eliminated by a further distillation to yield the preferred $C_{12}$–$C_{15}$ cut as an overhead fraction boiling below about 520° F.

Referring back to the light polymer overhead from recycle still 129, this polymer is returned to polymer recycle line 108 by line 143. Saturate buildup in the system is controlled by bleeding at least a portion of the recycle polymer through heat exchanger 146 to paraffin rejection still 147. Reference was previously made to the discovery that the saturate or paraffin hydrocarbons formed in reactor 110 are not uniformly distributed in molecular weight and the process of Fig. 3 may be operated to take advantage of this discovery by rejecting as overhead the more volatile components of the light polymer recycle thereby eliminating objectionable paraffin or saturate buildup at a minimum cost in light polymer rejection. Likewise, paraffin rejection still 147 may be operated to reject $C_5$ and lighter hydrocarbons with return of $C_6$ and higher polymer hydrocarbons, together with corresponding saturates, to the recycle stream. In this latter type of operation by-pass line 145 may be closed to divert all recycle stock through heater 144 and line 146 to still 147. Higher saturates retained in the recycle stream are decomposed or serve to suppress inordinate saturate buildup in the greater than $C_5$ molecular weight range.

However, as here shown, the process of Fig. 3 is operated to take a portion of the light polymer overhead, for example $C_5$ and lighter, more desirably $C_6$ and lower hydrocarbons together with the corresponding saturates or paraffins. This overhead fraction flows through outlet 148, condenser 149, reflux drum 151, circulation pump 152 and cooler 154 as polymer reject. Reflux on still 147 is maintained by valve-controlled reflux line 153.

Polymer reject may be discarded or, if desired, the unsaturated polymer portion may be separated from the saturated paraffin portion by selective solvent extraction, silica gel adsorption or the like in order to eliminate the paraffinic saturated components only. The extracted or adsorbed olefins freed of their saturated components are then returned to the system as a recycle stock.

The less volatile portion of the light polymer recycle stock flows downwardly through paraffin rejection still 147 to which heat is supplied by reboiler 156 and after being fractionated flows through outlet 157 and heat exchanger 144 to recycle line 108 by way of line 143 and steam-operated circulation pump 158.

The relative proportions of light recycle stock returned directly to the feed on one hand and by-passed to paraffin rejection still 147 on the other hand is controlled by any suitable means in by-pass line 145 across the inlet and outlet of preheater 144. Thus, suitable proportioning valves may be inserted in lines 145 and 146 to divide the two streams as desired.

Table II is an exemplary stock balance for an operation of the process and apparatus of Fig. 3. Exemplary reaction conditions are: pressure—500 pounds per square inch, reactor outlet temperature—460° F., and olefin space rate—0.23 liquid volumes of propylene per volume of catalyst per hour. Approximate overall conversion through the system is: ethylene—22%, propylene—90%, with reactor conversions at ethylene—15.6%, and propylene—74.8%. Rates of $C_4$ and $C_5$ hydrocarbon formation in terms of per cent of propylene reactant are approximately:

|  | Per cent |
|---|---|
| Butene | 0.064 |
| Butane | 5.93 |
| Pentene | 5.07 |
| Pentane | 9.39 |

Catalyst is orthophosphoric acid on kieselguhr.

F. was analyzed by two methods and the diolefin content found to be in the range of 16 to 26 mol per cent conjugated diolefin content is low, i. e. less than 5%.

When desired both the conjugated and non-conjugated diolefins may be eliminated for the production of monophenyl alkane. Silica gel adsorption processes, for example, may be utilized for separation of conjugated di-olefins prior to alkylation with benzene. It may be found more economical, however, to eliminate diolefins by alkylating benzene with the mixture to form monophenyl alkanes with the mono-olefins and di-phenyl alkanes from the diolefins, followed by separation of the mono- and di-phenyl compounds by distillation. The monophenyl alkane compounds are taken as overhead and the di-phenyl compounds separated therefrom as bottoms.

The amount of saturate formation and the related diolefin formation occurring in the polymerization zone may be controlled and reduced to some extent by manipulation or adjustment of reaction conditions. One of the most significant variables is pressure. High pressures, for example 500 pounds per square inch gauge, may tend to increase the rate of saturate formation as compared with lower pressures, such as atmospheric to 250 pounds per square inch gauge. At either high or low pressures, the severity of operating conditions as indicated by propylene conversion can be correlated with saturate formation, that is, the more severe the conditions or the higher the propylene conversion rate, the greater is the rate of saturate formation. Conversion rates of 70–90% are presently preferred. The ratio of saturates formed to heavy polymer formed appears to decrease with decreasing propylene concentration in the feed when dilution is with $C_3$ and lighter saturates.

The recycle ratios herein before given as preferred are for operations in which the recycle stream contains some saturates as in the specific examples on which stock balances are given. The ratios are in terms of polypropylene in the recycle stream as distinguished from gross

TABLE II

*Quantities in lbs./hr.*

| Component | Feed | Stream No. | | | | | | | | | | | Polymer Reject | Heavy Polymer |
|---|---|---|---|---|---|---|---|---|---|---|---|---|---|---|
| | | Recycle 126 | Recycle 143 | Recycle 108 | Feed 106 | 117 | 123 | 128 | 142 | 146 | 157 | 145 | | |
| $CH_4$ | 1,909 | 267 | | 267 | 2,176 | 2,175 | 1,908 | | | | | | | |
| $C_2H_4$ | 1,648 | 670 | | 670 | 2,318 | 1,956 | 1,286 | | | | | | | |
| $C_2H_6$ | 6,467 | 5,230 | | 5,230 | 11,697 | 11,697 | 6,467 | | | | | | | |
| $C_3H_6$ | 11,255 | 2,295 | | 2,295 | 13,550 | 3,421 | 1,126 | | | | | | | |
| $C_3H_8$ | 11,600 | 28,200 | | 28,200 | 39,800 | 39,800 | 11,600 | | | | | | | |
| $C_4H_8$ | 249 | 1,243 | 26 | 1,269 | 1,518 | 1,524 | 242 | 39 | 39 | 13 | | 26 | 13 | |
| $C_4H_{10}$ | 208 | 3,687 | 72 | 3,759 | 3,967 | 4,567 | 772 | 108 | 108 | 36 | | 72 | 36 | |
| $C_5H_{10}$ | | 565 | 1,055 | 1,620 | 1,620 | 2,133 | 28 | 1,540 | 1,540 | 512 | 27 | 1,028 | 485 | |
| $C_5H_{12}$ | | 1,050 | 1,955 | 3,005 | 3,005 | 3,955 | 51 | 2,854 | 2,854 | 949 | 50 | 1,905 | 899 | |
| Light Polymer (110°–360° F.) | | 1,527 | 81,419 | 82,946 | 82,946 | 82,986 | | 81,459 | 81,459 | 27,345 | 27,305 | 54,114 | 40 | |
| Heavy Polymer (360° F.+) | | | | | | 8,383 | | 8,383 | | | | | | 8,383 |
| Total | 33,336 | 44,734 | 84,527 | 129,261 | 162,597 | 162,597 | 23,480 | 94,383 | 86,000 | 28,855 | 27,382 | 57,145 | 1,473 | 8,383 |

The formation of paraffins from olefins in the polymerization reactor is accompanied by the formation of less saturated material. This less saturated reaction product appears to some extent as a highly olefinic tar or coke on the catalyst and some exists as di- or poly- olefins in the predominantly mono-olefin polymer fraction. A sample of propylene polymer boiling above 350° recycle hydrocarbon stream. In general, the higher the polypropylene content of the recycle stream, the lower the optimum recycle ratio of polypropylene to fresh propylene feed. (Note that this lower ratio is in terms of polypropylene and, therefore, is over and above the reduction resulting from mere decrease in saturate conthe recycle stream, a recycle ratio of about 2.0 to 2.5 by volume of polyproylene to 1 liquid volume of propylene feed is preferred.

Reference has been made to the fact that the molecular weight distribution of the interpolymers produced by the invention in the $C_{12}$ to $C_{15}$ range is especially advantageous for certain purposes, such as the production of synthetic detergents. The following distillations exemplify typical molecular weight distributions:

| Percent by Volume Overhead | $C_{12}$ Fraction Temp., °F.[1] | $C_{15}$ Fraction Temp., °F.[1] | $C_{12}$-$C_{15}$ Mixture Temp., °F. (ASTM-D86) |
|---|---|---|---|
| Start | 325 | 400 | 369 |
| 5 | 339 | 403 | 376 |
| 10 | 342 | 406 | 379 |
| 20 | 344 | 411 | 382 |
| 30 | 346 | 418 | 386 |
| 40 | 349 | 425 | 389 |
| 50 | 354 | 434 | 394 |
| 60 | 359 | 445 | 400 |
| 70 | 364 | 467 | 407 |
| 80 | 368 | 473 | 418 |
| 90 | 380 | 491 | 438 |
| 95 | 390 | 501 | 460 |
| End Point | 400 | 510 | 472 |

[1] These are vapor line temperatures.

A blend of from 60% to 80% of the foregoing $C_{12}$ fraction with from 40% to 20% of the $C_{15}$ fraction upon conversion to a monophenyl alkane yields a sulfonate detergent superior to either fraction alone. A single $C_{12}$ to $C_{15}$ cut with 80% boiling above 380° F. and 50% above 390° F. as in column 4 above, is superior even to the foregoing blend in this respect.

It is virtually impossible to define in terms of precise chemical structure the new mixture of olefins obtained according to this invention. However, the ratio of corrected optical density of the polymer at about 10.35 mu to corrected optical density at about 11.23 mu is definitive of significant chemical type structures characterizing the mixture of components and is indicative of the relative proportions of different types of components contained therein as will be apparent from the following discussion. The preferred olefins are derived from propylene by copolymerization as herein disclosed, and the foregoing ratio of such polymers is greater than unity.

Infrared absorption bands are caused by natural vibrations of the molecules of a chemical compound. Each atom in a molecule is free to vibrate about the other atoms to which it is bonded and does it with a natural and characteristic frequency. As the molecule is irradiated with light of this frequency, energy is absorbed by the molecule causing it to vibrate and thereby diminishing the intensity of the light which is transmitted. Likewise, each pair or characteristic group of atoms in a molecule has its own natural modes or frequency of vibration. The difference between the absorption frequencies of different chemical groups are often great enough to permit positive identification of the principal functional groups in a molecule. Thus, by irradiating a chemical compound or a mixture of compounds with infrared light to obtain the complete infrared absorption spectrum of the composition, one may obtain the sum of the contributions from all of the characteristic chemical or functional groups in the material and thereby determine its principal type components or features of chemical structure. Many of the correlations which have been made between molecular structures and frequencies of absorption bands are given in Table III.

TABLE III[1]

| Group | Wave Length |
|---|---|
| | Mu |
| C—H | 3.4 |
| O—H | 2.8 |
| C=C | 6.07 |
| $CH_2$ | 6.8 |
| $CH_3$ | 7.2 |
| $R-CH=CH_2$ (R—C=C with H,H,H) | 10.0 and 11.0 |
| $R-CH=CH-R'$ | 10.35 |
| $R-C(R')=CH_2$ | 11.25 |
| $R-C(R')=CH-R''$ | 12.5 |

[1] Thompson and Torkington Trans. Faraday Soc. 41, 246 (1945).

It has been found that infrared absorption and optical density in the 10.35 and 11.25 bands characterize olefin polymers having high resistance to fragmentation and degradation by anhydrous hydrofluoric acid.

The following data are illustrative:

TABLE IV

| | $C_{12}$ Propylene Polymer | $C_{12}$ Mixed Butene Polymer | $C_{12}$ Butene-1 Polymer | $C_{12}$ Butene-2 Polymer |
|---|---|---|---|---|
| $D_c$ @ 10.35 mu | 1.308 | 0.783 | 0.936 | 0.835 |
| $D'_c$ @ 11.25 mu | 1.020 | 1.49 | 1.173 | 1.04 |
| $\frac{D_c}{D'_c}$ = R factor | 1.28 | 0.525 | 0.797 | 0.803 |
| $E_{mol}$ @ 10.35 mu = Mol. Extinction Coefficient | 13.03 | 7.83 | 9.36 | 8.35 |

These data show that the ratio of corrected optical density ($D_c$) at 10.35 mu to corrected optical density to 11.25 mu is greater than 1 for olefin chains of polypropylene structure, whereas non-equivalent olefins, exemplified by polymers of the butenes are characterized by a value of less than 1 for the same ratio. This ratio of corrected optical densities at 10.35 mu and 11.25 mu is hereinafter termed "R factor."

Likewise, the foregoing data illustrate the fact that the desired olefins of polypropylene structure possess a molecular ($E_{mol}$) extinction coefficient greater than 10 and preferably greater than about 12 at 10.35 mu, whereas non-equivalent olefins have a molecular extinction coefficient less than 10 in this band.

The following test procedures are utilized for determining the above values.

*Test procedure for determining R factor*

Using an infrared spectrometer equipped with liquid cells of approximately 0.1 mm. in thickness, accurate optical density measurements of the olefin sample are made every .02 to .04 mu in the 10.35 mu absorption band (for example from 10.2 mu to 10.5 mu) and in the 11.25 mu absorption band (for example from 11.1 mu to 11.4 mu). An infrared spectrum is drawn plotting optical density as the ordinant v. wave length as the abscissae. The molecular weight and specific gravity of the olefin sample are measured by the usual methods. The optical density values corresponding to the peak of the absorbed band near 10.35 mu and near 11.25 mu are read from the spectrum, and each is corrected to a molecular weight basis of 100 and a specific gravity of 1 as follows:

$$D_c = \frac{D \text{ (measured} \times \text{(Mol. wt.)} \times 1)}{\text{(Specific gravity)} \times 100}$$

R factor is then determined as follows:

$$D = \frac{D_c \text{ at } 10.35 \text{ mu}}{D_c \text{ at } 11.25 \text{ mu}}$$

A value greater than unity for the R factor indicates a satisfactory propylene polymer and a polymer having a relatively high proportion of olefins with the structure:

An R factor less than unity indicates a polymer which is subject to degradation and fragmentation in the presence of active alkylation or condensation catalysts and shows that the polymer mixture contains a relatively high proportion of olefins having the structure:

*Test procedures for determining molecular extinction coefficient*

The optical density of the olefin sample corresponding to the peak of the absorption band near 10.35 mu is obtained as in the test procedure for determining R factor. From this measured optical density the measured molecular weight of the sample and the measured specific gravity, the molecular extinction coefficient is calculated as follows:

$E_{mol}$ @ 10.35 mu =

$$\frac{D \text{ (measured at } 10.35 \text{ mu)} \times \text{(Mol. Wt.)}}{1000 \times \text{(specific gravity)} \times \text{(thickness of sample in centimeters)}}$$

Values greater than 10 for $E_{mol}$ at 10.35 mu and preferably greater than 12 indicate a satisfactory polymer having a relatively high concentration of olefins of the structure:

Non-equivalency of different branched-chain olefins in the HF alkylation of benzene are illustrated by the following:

TABLE V

|  | R factor | $E_{mol}$ @ 10.35 mu | Alkylation Benzene and HF Yield $C_{15}$ Cut | Loss From HF Degradation and Side Reaction |
|---|---|---|---|---|
| $C_{12}$ Polypropylene | greater than 1 | greater than 10 | 80% | less than 12%. |
| $C_{12}$ Polybutenes | less than 1 | less than 10 | less than 30% | 50% Approx. |

As previously indicated the exact chemical constitution of the compositions produced according to this invention cannot be precisely defined. However, the infrared absorption spectrum clearly indicates that the olefins of polypropylene structure are largely of the type:

rather than

The $C_{12}$ to $C_{15}$ olefins produced according to this invention are useful not only in the production of phenyl alkanes and sulfonated derivatives thereof, but are capable of other applications. For example, these polymers may be hydrogenated to produce long chain alkanes which, in turn, may be converted to alkyl sulfonates by chlorosulfonation according to the method disclosed in Reissue Patent No. 20,968, granted to Reed. The resulting sulfonates so obtained have valuable surface active properties. Further, the $C_{12}$ to $C_{15}$ olefins of this invention may be converted to the corresponding alcohols by any suitable process, such as a hydrochlorination of the olefin bond and hydrolysis of the resulting alkyl chloride. Again, the $C_{12}$ to $C_{15}$ olefins may be condensed with phenol by hydrofluoric acid or sulfuric acid catalysis to yield a corresponding alkyl phenol. These alkyl phenols are useful as such or may be converted to polyvalent phenates which are particularly well adapted for addition to hydrocarbon lubricating oils as a stabilizing or anti-ring sticking agent. Also, the olefins may be alkylated with isobutene by sulfuric or hydrofluoric acid catalysis to yield saturated alkyl compounds. In short, the relative stability and resistance to fragmentation of the $C_{12}$ to $C_{15}$ olefins herein produced adapt the compounds to preparation of derivatives containing relatively stable long alkyl chains having chain branching within controlled limits.

In the appended claims the terms "tetramer" fraction and "pentamer" fraction are used to specify, respectively, the fractions designated in this specification as $C_{12}$ and $C_{15}$ fractions. It is to be understood that the polymerization reaction does not necessarily proceed so smoothly or accurately as to yield only "tetramers" and "pentamers" or even only $C_{12}$ and $C_{15}$ hydrocarbons, but that the terms "tetramer" and "pentamer" are meant to be descriptive of those olefin hydrocarbons present in the polymer product and boiling in the defined range which embraces the boiling points of various isomeric $C_{12}$ and $C_{15}$ polymer hydrocarbons present therein.

The character of the invention and the value thereof can be seen from a consideration of the preceding specification and the results given, but neither is to be considered as imposing corresponding limitations upon the scope of the invention as defined in the appended claims.

We claim:

1. A cyclic process for producing a mixture of branched-chain olefins boiling above 360° F. and having an "R factor" greater than 1, which comprises polymerizing a mixture of propylene with a propylene polymer fraction boiling below 360° F. by passing propylene through a polymerization zone containing a solid phosphoric acid polymerization catalyst at a temperature of from about 375° F. to about 500° F., separating from the reaction mixture a more volatile olefinic hydrocarbon polymer fraction boiling below 360° F., recycling at least about two liquid volumes of said more volatile polymer fraction per volume of propylene through said polymerization zone whereby conversion to polymeric olefins boiling above 360° F. tends materially to decline as said recycling is continued, and reducing said decline in conversion by selectively rejecting from the cycle a light hydrocarbon fraction boiling below 360° F. and comprising at least $C_4$ saturated hydrocarbons formed in the polymerization zone.

2. A cyclic process which comprises converting propylene to a mixture of polymeric olefins boiling above 325° F. and below about 520° F. by contacting propylene with an acid polymerization catalyst in a polymerization zone, separating from the reaction mixture a lower boiling but normally liquid olefin polymer fraction, recycling said lower boiling liquid polymer fraction to the polymerization zone, recovering from the reaction products a higher boiling mixture of polymeric olefins boiling above 325° F., and inhibiting decline in conversion rate to said higher boiling polymeric olefin mixture by rejecting from the polymerization cycle a fraction comprising saturated hydrocarbons formed in said polymerization zone.

3. A process as defined in claim 2 wherein said rejected fraction comprises saturated hydrocarbons within the $C_4$ to $C_6$ range formed in said polymerization zone.

4. A process as defined in claim 2 wherein said rejection is by fractionation of the polymerization reaction mixture to remove a light hydrocarbon fraction containing saturated hydrocarbons within the $C_4$ to $C_6$ range and formed in said polymerization zone.

5. A process as defined in claim 2 wherein said decline in conversion rate is inhibited by fractionating said lighter olefin polymer fraction to reject saturated hydrocarbons within the $C_4$ to $C_6$ range formed in said polymerization zone.

6. A cyclic process for producing a mixture of branched-chain olefins boiling above about 325° F. which comprises polymerizing a mixture of propylene with a propylene polymer fraction boiling below about 360° F. by passing said mixture through a polymerization zone containing a phosphoric acid polymerization catalyst at a temperature of from about 375° F. to about 500° F., separating from the reaction mixture more volatile but normally liquid olefin polymer hydrocarbons boiling below 360° F., recycling said more volatile olefin polymers through said polymerization zone whereby conversion to polymeric olefins boiling above about 325° F. tends materially to decline as said recycling is continued, and reducing said decline in conversion by rejecting from the cycle a light hydrocarbon fraction containing saturated hydrocarbons in the $C_4$ to $C_6$ range formed in the polymerization zone.

7. A process as defined in claim 6 wherein said light hydrocarbon fraction is rejected by distillation of the polymerization reaction mixture.

8. A process as defined in claim 6 wherein said light hydrocarbon fraction is rejected by distillation of said more volatile but normally liquid olefin polymer fraction boiling below 360° F.

9. A cyclic process for producing a mixture of branched chain olefins boiling above about 325° F. which comprises contacting propylene with an acid polymerization catalyst in a polymerization zone, separating from the mixture of polymers thereby formed a more volatile but normally liquid fraction of lower boiling olefin polymers, recovering a less volatile fraction of higher polymeric olefins, said higher olefins boiling above about 325° F. and below about 520° F., recycling said more volatile polymer fraction to the polymerization zone, and inhibiting decline in conversion rate to said higher boiling polymeric olefin mixture by rejecting from the polymerization cycle a fraction comprising saturated hydrocarbons formed in said polymerization zone.

LLOYD F. BROOKE.
WILLIAM E. ELWELL.
RICHARD L. MEIER.

REFERENCES CITED

The following references are of record in the file of this patent:

UNITED STATES PATENTS

| Number | Name | Date |
|---|---|---|
| 2,181,640 | Deanesly et al. | Nov. 28, 1939 |
| 2,182,617 | Michel | Dec. 5, 1939 |
| 2,216,549 | Deanesly | Oct. 1, 1940 |
| 2,221,171 | Story | Nov. 12, 1940 |
| 2,421,951 | Linn | June 10, 1947 |
| 2,446,619 | Stewart et al. | Aug. 10, 1948 |